(12) United States Patent
Sabi

(10) Patent No.: US 8,598,828 B2
(45) Date of Patent: Dec. 3, 2013

(54) WIPER PARK SWITCH INPUT SIGNAL NOISE REJECTION CIRCUIT

(75) Inventor: Nazmi A. Sabi, Rochester, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 197 days.

(21) Appl. No.: 13/346,845

(22) Filed: Jan. 10, 2012

(65) Prior Publication Data

US 2013/0175962 A1    Jul. 11, 2013

(51) Int. Cl.
*G05B 5/00*    (2006.01)

(52) U.S. Cl.
USPC .............................. 318/468; 318/444; 318/483

(58) Field of Classification Search
USPC .................. 318/468, 444, 483, 643, 480, 490
See application file for complete search history.

(56) References Cited

U.S. PATENT DOCUMENTS 5,220,287 A *  6/1993  Astridge ..................... 330/132
5,869,942 A     2/1999  Miller et al.

* cited by examiner

*Primary Examiner* — Karen Masih
(74) *Attorney, Agent, or Firm* — Frederick A. Krieger

(57) ABSTRACT

A wiper system is provided and may include a wiper that operates between a parked state and a use state, a motor associated with the wiper that selectively moves the wiper between the parked state and the use state, and a switch that generates a signal identifying whether the wiper is in the parked state or the use state. The wiper system may also include a controller in communication with the switch. The controller may include a second-order filter and a comparator, whereby the controller passes the signal through the second-order filter and the comparator to differentiate between the parked state and the use state.

18 Claims, 4 Drawing Sheets

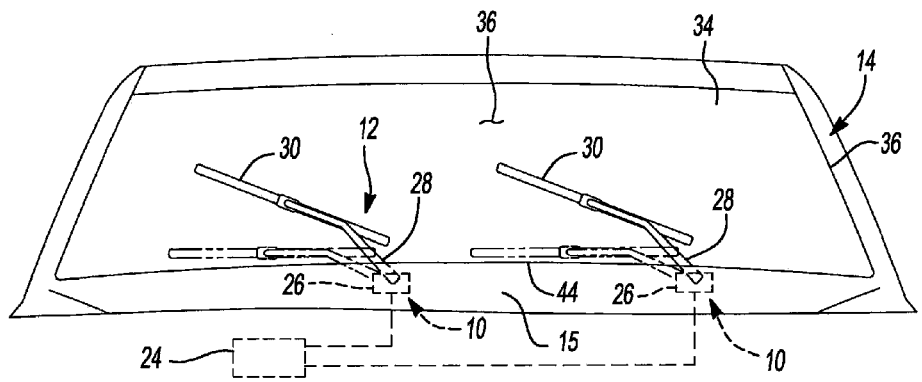
*Fig-1*
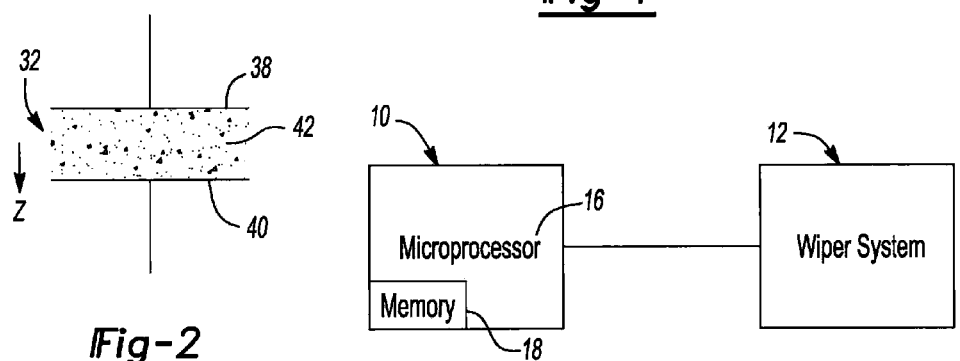
*Fig-2*
*Fig-3*
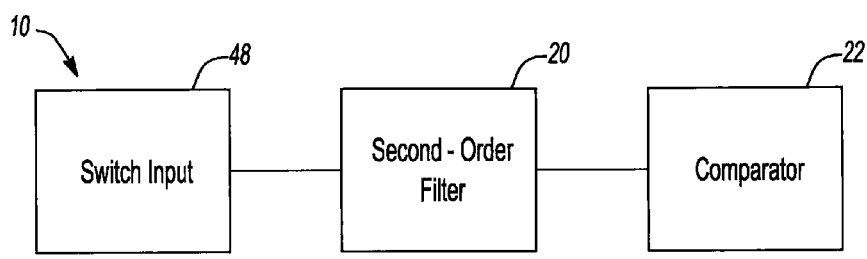
*Fig-4*

US 8,598,828 B2

WIPER PARK SWITCH INPUT SIGNAL NOISE REJECTION CIRCUIT

FIELD

The present disclosure relates to wiper systems and more particularly to a control system for use with a wiper system.

BACKGROUND

Modern vehicles typically include at least one wiper system for use in maintaining a surface of the vehicle clean during inclement weather conditions by removing debris (i.e., water, leaves, etc.) from the surface. For example, a passenger car such as a sedan or coupe may include a wiper system associated with a front windshield while a sport utility vehicle may include a wiper system associated with both a front windshield and a rear windshield. Any of foregoing vehicles may also include a wiper system associated with front headlamps of the particular vehicle that likewise maintains an outer surface of the headlamps free from debris.

Wiper systems typically include a wiper arm, a wiper blade in contact with a surface of the vehicle, and a motor. The wiper blade is in contact with the vehicle surface and is selectively moved relative thereto by the motor and wiper arm to remove debris from the vehicle surface. Removing debris from the vehicle surface improves visibility through a windshield of the vehicle and, in some instances, enhances the ability of the headlamps in illuminating an area in front of the vehicle.

Regardless of the particular location of the wiper system (i.e., a front windshield, a rear windshield, or vehicle headlamps), wiper systems typically include a control system that permits an occupant to selectively toggle the wiper system between an ON state and an OFF state. While most wiper systems allow an occupant to manually control the system between an ON state and an OFF state, some wiper systems additionally include an automatic-control system that responds to environmental conditions such as rain. Regardless of whether the wiper system is manually controlled or automatically controlled, a position of the wiper system must be known by a controller associated with the wiper system to properly respond to a command from an occupant or from an automatic-control system.

Conventional wiper systems typically include a switch that responds to movement of the wiper system into a parked state proximate to a cowl of the vehicle. The switch provides a controller associated with the wiper system with the current position of the wiper arm/wiper blade in order to allow the controller to properly execute a manual or automatic command. For example, a conventional wiper system may include a mechanical switch that identifies the parked position of a wiper arm/wiper blade of the wiper system to provide a controller with information as to the current state and location of the wiper arm/wiper blade relative to a surface of the vehicle.

While mechanical switches adequately convey information to a controller associated with a wiper system during warm-weather or hot-weather conditions, such mechanical switches typically fail to adequately convey such information during cold-weather conditions. As such, wiper arms/wiper blades are often cycled relative to a surface of a vehicle even after a controller receives information from an occupant or from an automatic-control system that the wiper arm/wiper blade should be in a parked state.

SUMMARY

A wiper system is provided and may include a wiper that operates between a parked state and a use state, a motor associated with the wiper that selectively moves the wiper between the parked state and the use state, and a switch that generates a signal identifying whether the wiper is in the parked state or the use state. The wiper system may also include a controller in communication with the switch. The controller may include a second-order filter and a comparator, whereby the controller passes the signal through the second-order filter and the comparator to differentiate between the parked state and the use state.

In another configuration, a vehicle is provided and may include a wiper associated with a surface of the vehicle, a motor that selectively moves the wiper between a parked state and a use state relative to the surface, and a switch that generates a signal identifying whether the wiper is in the parked state or the use state. The wiper system may also include a controller in communication with the switch. The controller may include a second-order filter and a comparator, whereby the controller passes the signal through the second-order filter and the comparator to differentiate between the parked state and the use state.

Further areas of applicability of the present disclosure will become apparent from the detailed description, drawings and claims provided hereinafter. It should be understood that the detailed description, including disclosed embodiments and drawings, are merely exemplary in nature, intended for purposes of illustration only, and are not intended to limit the scope of the invention, its application, or use. Thus, variations that do not depart from the gist of the invention are intended to be within the scope of the invention.

BRIEF DESCRIPTION OF THE DRAWINGS

FIG. 1 is a partial perspective view of a vehicle incorporating a wiper-control system in accordance with the principles of the present disclosure;

FIG. 2 is a schematic representation of a switch for use with the wiper-control system of FIG. 1;

FIG. 3 is a schematic representation of a wiper-control system in accordance with the principles of the present disclosure;

FIG. 4 is a schematic representation of a portion of the wiper-control system of FIG. 3;

DETAILED DESCRIPTION

With reference to the figures, a wiper-control system 10 for use with a wiper system 12 is provided. The wiper-control system 10 may be used in conjunction with the wiper system 12 to identify a position of the wiper system 12 relative to a vehicle 14 for use by the wiper-control system 10 in controlling the wiper system 12.

Figure 5:
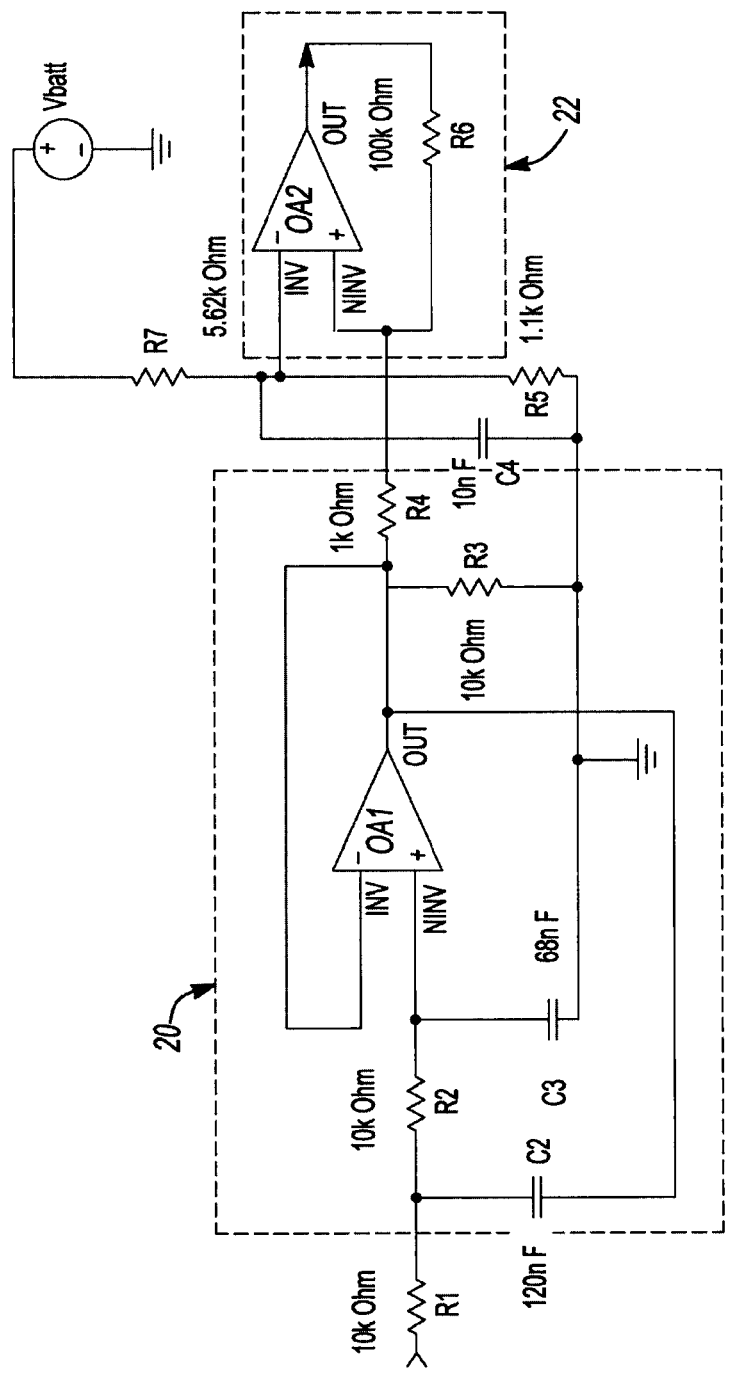
FIG. 5 is a circuit diagram illustrating the second-order filter and comparator of the wiper-control system of FIG. 4.

The wiper-control system 10 may include a microprocessor 16 and a memory 18 (FIG. 3). Additionally, the wiper-control system 10 may include a second-order filter 20 and a comparator 22 (FIGS. 4 and 5). The second-order filter 20 and the comparator 22 may be an integral component of the microprocessor 16 and may be used to filter a noisy signal (FIG. 6) in an effort to provide a clean signal (FIG. 8) for analysis.

The second-order filter 20 may be used to attenuate noise associated with a signal. Namely, the second-order filter 20 may process a signal to remove unwanted frequency components from the signal and/or to enhance desired frequency components. In the schematic shown in FIG. 5, the second-order filter 20 is shown to include an operational amplifier (OA1) and a series of resistors (R2-R3) that cooperate to remove noise from a signal received initially at resistor (R2).

Figure 6:
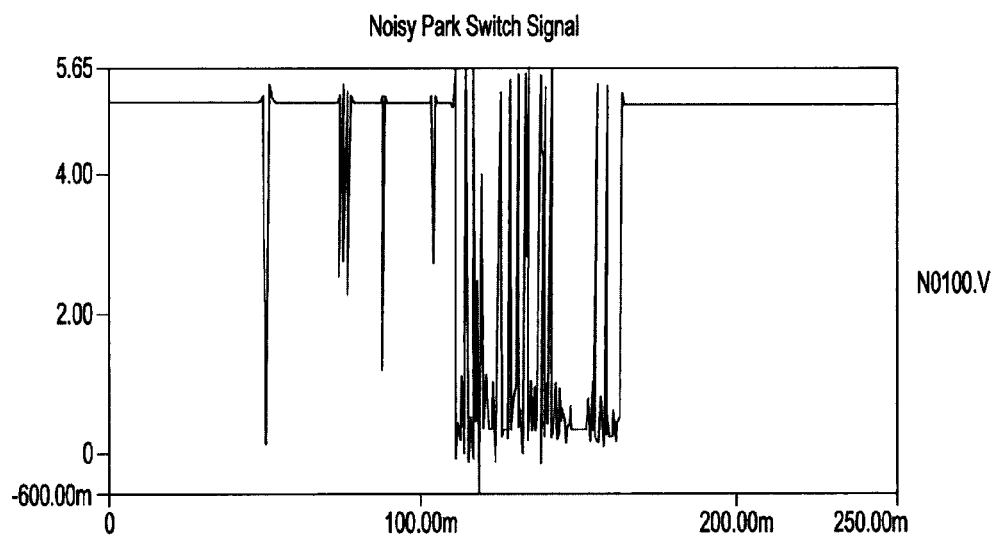
FIG. 6 is a plot of a noisy switch signal prior to being passed through the second-order filter of FIGS. 3 and 5.
Figure 7:
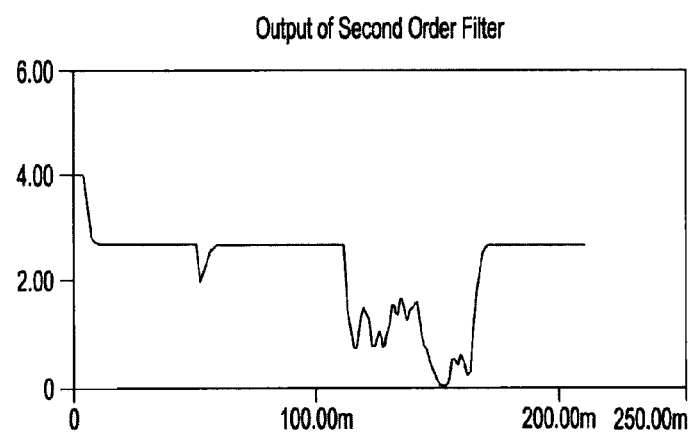
FIG. 7 is a plot of a switch signal after passing through the second-order filter of FIGS. 3 and 5.

The second-order filter 20 may receive a signal similar to the signal shown in FIG. 6 and may filter the signal to remove unwanted frequency components. The output of the second-order filter 20 is a somewhat squared waveform (FIG. 7) that has fewer frequency variations.

Figure 8:
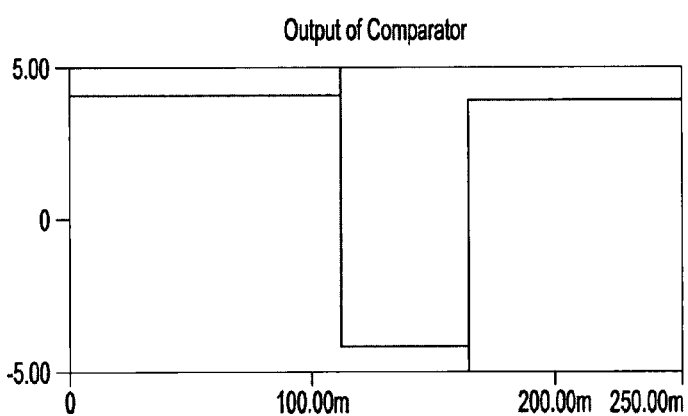
FIG. 8 is a plot of a switch signal after passing through the second-order filter and comparator of FIGS. 3 and 5.

The output of the second-order filter may then be passed through the comparator 22. As shown in FIG. 5, the comparator 22 may include an operational amplifier (OA2) and a resistor (R6) that cooperate to further refine the signal. Specifically, the comparator 22 compares the voltage of the signal received from the second-order filter 20 to a reference voltage and switches its output depending on the comparison. After passing the signal received from the second-order filter 20 through the comparator 22, the waveform is squared and resembles a pulse wave (FIG. 8).

The wiper-control system 10—including the microprocessor 16, memory 18, second-order filter 20, and comparator 22—may be integrated into a controller 24 (FIG. 1) of the vehicle 14. For example, the controller 24 may be a central body controller of the vehicle 14 and may be located remotely from the wiper system 12. Regardless of the particular configuration and location of the wiper-control system 10, the wiper-control system 10 is in communication with the wiper system 12, as will be described in greater detail below.

With particular reference to FIGS. 1 and 2, the wiper system 12 is shown to include a motor 26, a wiper arm 28, a wiper blade 30, and a switch 32. The motor 26 may be disposed proximate to a bottom portion of a windshield 34 of the vehicle 14 and may selectively move the wiper arm 28 and wiper blade 30 relative to an outer surface 36 of the windshield 34. As shown in FIG. 1, the wiper system 12 may include a pair of motors 26, a pair of wiper arms 28, and a pair of wiper blades 30. If the wiper system 12 includes a pair of motors 26, a pair of wiper arms 28, and a pair of wiper blades 30, the motors 26 may be synchronized such that each wiper arm 28 and wiper blade 30 are moved substantially simultaneously with one another relative to the outer surface 36 of the windshield 34.

The switch 32 may be provided proximate to the motor 26 and/or wiper arm 28 and may be used to identify a position of the wiper arm 28 and wiper blade 30 relative to the windshield 34. In one configuration, the switch 32 may include a first plate 38, a second plate 40, and conductive grease 42 disposed between the first plate 38 and second plate 40.

The first plate 38, second plate 40, and conductive grease 42 cooperate to determine whether the wiper arm 28 and wiper blade 30 are in a parked state (shown in phantom in FIG. 1) or are in a use state (shown in solid lines in FIG. 1). Specifically, one of the first and second plates 38, 40 may be supplied with a voltage (i.e., 5V) while the other of the first and second plates 38, 40 may be at ground. For exemplary purposes, the first plate 38 will be described as receiving a voltage while the second plate 40 will be described as being at ground.

When the wiper arm 28 and wiper blade 30 are returned to the parked state, a force may be applied to one of the first and second plates 38, 40 via the wiper arm 28 and/or via a component fixed for movement with the wiper arm 28 to cause relative movement of one of the plates 38, 40 relative to the other of the plates 38, 40. In the configuration shown in FIG. 2, the force is represented by arrow (Z) such that the first plate 38 is moved toward the second plate 40. Once the first plate 38 is moved sufficiently close to the second plate 40, the voltage supplied to the first plate 38 causes a current to flow to the second plate 40 via the conductive grease 42, which may be used to generate a signal for use by the microprocessor 16 of the wiper-control system 10 in determining a position of the wiper arm 28 and wiper blade 30.

When the wiper arm 28 and wiper blade 30 are in a parked state, the wiper arm 28 and wiper blade 30 are disposed generally parallel to and/or below a bottom edge 44 of the windshield 34 in an area proximate to a cowl 15 of the vehicle 14. When the wiper arm 28 and wiper blade 30 are in the parked state, current is permitted to flow between the first plate 38 and the second plate 40 via the conductive grease 42, which allows the switch 32 to generate a signal indicative of the wiper arm 28 and wiper blade 30 being disposed in the parked state.

When the wiper arm 28 and wiper blade 30 are moved relative to the outer surface 36 of the windshield 34 via a force imparted thereon by the motor 26, the switch 32 may generate a signal indicating that the wiper arm 28 and wiper blade 30 are in a use state, as current no longer flows from the first plate 38 to the second plate 40. As shown in FIG. 1, the wiper arm 28 and wiper blade 30 are in the use state when the wiper blade 32 engages the outer surface 36 of the windshield 34 at a location generally between the bottom edge 44 of the windshield 34 and any portion of the outer surface 36 generally between the bottom edge 44 of the windshield 34 and a side edge 46 of the windshield 34.

With particular reference to FIGS. 3-10, operation of the wiper-control system 10 and wiper system 12 will be described in detail. In operation, an occupant of the vehicle 14 may control the wiper system 12 by selectively causing the wiper arm 28 and wiper blade 30 to move between the parked state and the use state to remove debris from the outer surface 36 of the windshield 34. For example, the vehicle 14 may include a user-input switch (not shown) that allows the occupant to toggle the wiper system 12 and, thus, the wiper arm 28 and wiper blade 30, between the parked state and the use state by actuating the user-input switch.

In operation, the occupant may depress the user-input switch or may move the user-input switch to a position, whereby the switch signals the wiper-control system 10 to energize the motor 26 and cause the wiper arm 28 and wiper blade 30 to move from the parked state proximate to the bottom edge 44 of the windshield 34 into the use state. Moving the wiper arm 28 and wiper blade 30 from the parked state into the use state causes the wiper arm 28 and wiper blade 30 to move generally across the windshield 34 between the bottom edge 44 and the side edge 46 to remove debris (i.e., rain, ice, leaves, etc.) from the outer surface 36 of the windshield 34. Once the occupant determines that the debris has been sufficiently removed from the outer surface 36 of the windshield 34, the user may again depress the user-input switch or may otherwise move the user-input switch into an OFF state that directs the wiper-control system 10 to position the wiper arm 28 and wiper blade 30 in the parked state proximate to the bottom edge 44 of the windshield 34.

While the wiper-control system 10 is described as being responsive to a user-input switch controllable by an occupant of the vehicle 14, the wiper-control system 10 could additionally or alternatively be responsive to an automatic-control system (not shown) that directs the wiper-control system 10 to move the wiper arm 28 and wiper blade 30 between the parked state and the use state automatically. For example, the automatic control system may include at least one sensor (not shown) that is responsive to environmental conditions such as precipitation being located on the outer surface 36 of the windshield 34. Information from the sensor(s) allows the automatic-control system to direct the wiper-control system 10 to move the wiper arm 28 and wiper blade 30—via the wiper-control system 10—from the parked state proximate to the bottom edge 44 of the windshield 34 and into the use state to remove the debris from the outer surface 36. While the wiper-control system 10 could be used in conjunction with a user-input switch and/or an automatic control system, the wiper-control system 10 will be described hereinafter as being used in conjunction with a manual-input switch.

When an occupant of the vehicle 14 actuates the user-input switch, a signal is sent to the wiper-control system 10. If the occupant actuates the user-input switch to direct the wiper arm 28 and wiper blade 30 into the use position, the wiper-control system 10 energizes the motor 26 to cause the wiper arm 28 and wiper blade 30 to move from the parked state into the use state. If, on the other hand, the occupant actuates the user-input switch to direct the wiper arm 28 and wiper blade 30 into the parked state, the wiper-control system 10 controls the motor 26 to maintain the wiper arm 28 and wiper blade 30 in the parked state upon return of the wiper arm 28 and wiper blade 30 into the parked state.

Generally speaking, when an occupant actuates the user-input switch to direct the wiper arm 28 and wiper blade 30 into the use state, an ON signal may be transmitted from the user-input switch to the wiper-control system 10 to alert the wiper-control system 10 that the wiper system 12 should be moved into the use state. Conversely, when an occupant actuates the user-input switch to direct the wiper system 12 into the parked state, an OFF signal may be transmitted from the user-input switch to the wiper-control system 10 to direct the wiper system 12 into the parked state or to maintain the wiper system 12 in the parked state.

During use, the wiper-control system 10 operates the wiper system 12 based on the signal received from the user-input switch. Namely, if the wiper-control system 10 receives an ON signal, the wiper-control system 10 energizes the motor 26 of the wiper system 12 to cause the wiper arm 28 and wiper blade 30 to move from the parked state generally proximate to the bottom edge 44 of the windshield 34 across the outer surface 36 of the windshield 34 and toward the side edge 46 of the windshield 34. The wiper arm 28 and wiper blade 30 move toward the side edge 46 of the windshield 34 and then sweep back across the outer surface 36 of the windshield 34 toward the bottom edge 44. Once the wiper arm 28 and wiper blade 30 reach the parked state in an area of the windshield 34 proximate to the bottom edge 44, the switch 32 identifies the location of the wiper arm 28 and wiper blade 30 and provides a signal to the wiper-control system 10 at the switch input 48.

When the switch 32 indicates that the wiper arm 28 and wiper blade 30 are in the parked state and are located proximate to the bottom edge 44 of the windshield 34, the wiper-control system 10 first determines whether the signal received from the user-input switch is an ON signal or an OFF signal. If the signal is an ON signal, the wiper-control system 10 continues to energize the motor 26 to cause the wiper arm 28 and wiper blade 30 to move from the parked state to the use state once again. If, on the other hand, the wiper-control system 10 receives an OFF signal from the user-input switch, the wiper-control system 10 will prevent movement from the wiper arm 28 and wiper blade 30 from the parked state to the use state once the wiper arm 28 and wiper blade 30 return to the parked state. The wiper-control system 10 identifies that the wiper arm 28 and wiper blade 30 have returned to the parked state based on information received from the switch 32.

Whether the wiper arm 28 and wiper blade 30 are returned to the parked state and are maintained in the parked state or, alternatively, are directed from the parked state immediately back into the use state, the wiper-control system 10 identifies a position of the wiper arm 28 and wiper blade 30 based on information received from the switch 32. The information received from the switch 32 is referred to as the switch input 48, which may be directed to the second-order filter 20 upon receipt of the signal from the switch 32. The second-order filter 20 attenuates noise associated with the signal received from the switch 32 and generates a filtered output.

The filtered output generated by the second-order filter 20 is subsequently passed through a comparator 22 to further reject any remaining noise spikes within the signal. As described above, the output of the comparator 22 is a pulse wave (FIG. 8), which may be used by the wiper-control system 10 to clearly distinguish between the wiper arm 28 being in the parked state and the wiper arm 28 being in the use state. For example, if the waveform output by the comparator 22 includes peaks at 5V and valleys at 0V, the wiper-control system 10 can determine that the wiper arm 28 is in the parked state at 5V and is in the use state at 0V, as 5V is supplied to the second-order filter 20 and comparator 22 when current flows from the first plate 38 to the second plate 40 of the switch 32.

Figure 9:
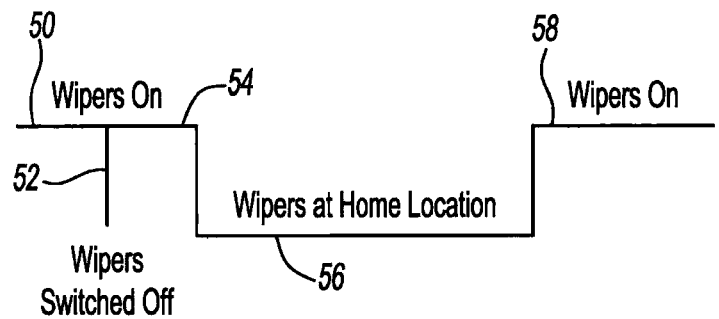
FIG. 9 is a schematic representation of a switch signal after passing through the second-order filter and comparator of FIGS. 3 and 5.

For example, and with reference to FIG. 9, a schematic representation of a pulse wave generated by the wiper-control system 10 is provided for use in controlling the wiper system 12. As described above, the pulse wave is generated based on a signal received from the switch 32 at switch input 48 and is generated by passing the switch signal first through the second-order filter 20 and subsequently through the comparator 22. In FIG. 9, the peaks generally correspond to the wiper arm 28 and wiper blade 30 being in the use state and the valley corresponds to the wiper arm 28 and wiper blade 30 being in the parked state.

At position 50 (FIG. 9), the wiper arm 28 and wiper blade 30 are in the use state and are positioned along the outer surface 36 of the windshield 34 at a location generally between the bottom edge 44 and the side edge 46. If an OFF signal is received by the wiper-control system 10 from the user-input switch at position 52 during movement across the outer surface 36 between the bottom edge 44 and the side edge 46, the wiper arm 28 and wiper blade 30 will continue to pass over the outer surface 36 at position 54 until the switch 32 indicates that the wiper arm 28 and wiper blade 30 are in the parked state.

The switch 32 provides a signal at the switch input 48 when the wiper arm 28 and wiper blade 30 are in the parked state and apply a force (Z) on the switch 32. At this point, the wiper-control system 10 can clearly identify that the wiper arm 28 and wiper blade 30 are in the parked state based on the valley identified at position 56 regardless of where along position 56 the wiper-control system 10 reads the signal.

The wiper-control system 10 will maintain the wiper arm 28 and wiper blade 30 in the parked state until an ON signal is once again received from the user-input switch. Upon receipt of the ON signal, the wiper-control system 10 again energizes the motor 26 to cause the wiper arm 28 and wiper blade 30 to move from the parked state to the use state. Movement of the wiper arm 28 and wiper blade 30 into the use state is identified by position 58 shown in FIG. 9.

Without use of the second-order filter 20 and comparator 22, the waveform generated by the switch 32 may include a substantial amount of noise. For example, a waveform similar to the waveform shown in FIG. 10 may include a degree of noise that may inadvertently cause the wiper-control system 10 to incorrectly determine a position of the wiper arm 28 and wiper blade 30.

For example, the wiper arm 28 and wiper blade 30 may be in the use position at position 60 and may be sweeping across the outer surface 36 of the windshield 34 between the bottom edge 44 and the side edge 46. During such motion of the wiper arm 28 and wiper blade 30 across the outer surface 36 of the windshield 34, a user may actuate the user-input switch, thereby sending an OFF signal to the wiper-control system 10 at position 62. At this point, the wiper arm 28 and wiper blade 30 continue to sweep across the outer surface 36 of the windshield 34 at position 64 until the wiper-control system 10 determines that the wiper arm 28 and wiper blade 30 are in the parked state.

Figure 10:
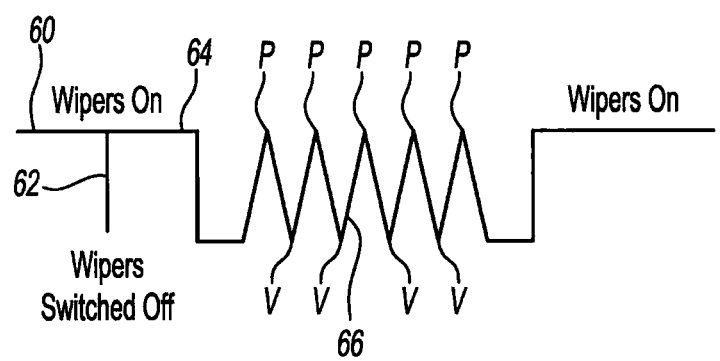
FIG. 10 is a schematic representation of a switch signal prior to passing through the second-order filter and comparator of FIGS. 3 and 5.

The wiper-control system 10 can only accurately detect that the wiper arm 28 and wiper blade 30 are in the parked state based on the signal received from the switch 32. If the signal received from the switch 32 is not passed through the second-order filter 20 and comparator 22, as described above, the signal received from the switch 32 may contain a fair degree of noise (FIG. 10). This condition may further be exacerbated during cold-weather conditions, whereby the conductive grease 42 disposed between the first plate 38 and the second plate 40 fails to cleanly conduct current from the first plate 38 to the second plate 40.

The waveform shown in FIG. 10 schematically illustrates the noisy waveform at position 66, whereby the waveform includes a series of alternating peaks (P) and valleys (V). If the microprocessor 16 of the wiper-control system 10 reads the waveform at position 66 at each of the valleys (V), the wiper-control system 10 accurately will determine that the wiper arm 28 and wiper blade 30 are located in the parked state and will maintain the wiper arm 28 and wiper blade 30 in the parked state, as desired by the user. However, if the wiper-control system 10 reads the waveform at position 66 at one or more of the peaks (P), the wiper-control system 10 may incorrectly determine the position of the wiper arm 28 and wiper blade 30, thereby allowing the wiper arm 28 and wiper blade 30 to move away from the bottom edge 44 of the windshield 34 and into the use state even if the desired position is the parked state.

Passing the signal received from the switch 32 through the second-order filter 20 and the comparator 22 adequately filters the signal received from the switch 32 into the squared waveform shown in FIG. 9, thereby allowing the wiper-control system 10 to accurately determine a position of the wiper arm 28 and wiper blade 30 relative to the windshield 34. As such, when an occupant actuates the user-input switch to send an OFF signal to the wiper-control system 10, the wiper-control system 10 can quickly respond to the OFF signal by maintaining the wiper arm 28 and wiper blade 30 in the parked state upon return of the wiper arm 28 and wiper blade 30 into the parked state from the use state.

Providing the wiper-control system 10 with accurate information as to the position of the wiper arm 28 and wiper blade 30 during warm-weather conditions, hot-weather conditions, and cold-weather conditions allows the wiper-control system 10 to accurately respond to commands input by an occupant via the user-input switch, as described above. Further, accurately determining a position of the wiper arm 28 and wiper blade 30 relative to the windshield 34 likewise allows the wiper-control system 10 to dynamically break the wiper arm 28 and wiper blade 30 to prevent the wiper arm 28 and wiper blade 30 from moving toward the use position from the parked position when an occupant desires the wiper arm 28 and wiper blade 30 to be in the parked state.

For example, the wiper-control system 10 may dump excess current across the motor 26 of the wiper system 12 to restrict motion of the wiper arm 28 and wiper blade 30 toward the use state once the wiper arm 28 and the wiper blade 30 reach the parked state proximate to the bottom edge 44 of the windshield 34. Accurately determining when the wiper arm 28 and wiper blade 30 reach the parked state allows the wiper-control system 10 to accurately and timely apply dynamic braking to the motor 26, thereby maintaining the wiper arm 28 and wiper blade 30 in the parked state when an OFF signal is received by the wiper-control system 10. Therefore, passing the signal received from the switch 32 through the second-order filter 20 and comparator 22 to generate the squared waveform shown in FIG. 9 at position 56 allows the wiper-control system 10 to accurately determine a position of the wiper arm 28 and wiper blade 30 relative to the windshield 34, which therefore allows the wiper-control system 10 to accurately and timely control the wiper arm 28 and wiper blade 30 in response to the commands of an occupant via the user-input switch in all weather conditions.

What is claimed is:

1. A wiper system comprising:
   a wiper operable between a parked state and a use state;
   a motor associated with said wiper and operable to selectively move said wiper between said parked state and said use state;
   a switch operable to generate a signal that identifies whether said wiper is in said parked state or said use state; and
   a controller in communication with said switch and including a second-order filter and a comparator, said controller passing said signal through said second-order filter and said comparator to differentiate between said parked state and said use state.

2. The wiper system of claim 1, wherein said switch includes a first plate, a second plate, and a conductive grease disposed between said first plate and said second plate.

3. The wiper system of claim 1, wherein said controller passes said signal through said second-order filter and subsequently passes an output of said second-order filter through said comparator.

4. The wiper system of claim 1, wherein said controller is a body controller of a vehicle.

5. The wiper system of claim 1, further comprising a user-input switch selectively supplying said controller with a control signal to direct said wiper between said parked state and said use state.

6. The wiper system of claim 5, wherein said controller identifies a state of said wiper based on an output of said comparator and controls said wiper based on said control signal.

7. The wiper system of claim 5, wherein said control signal is one of an ON signal requesting movement of said wiper between said parked state and said use state and an OFF signal requesting said wiper to remain in said parked state.

8. The wiper system of claim 7, wherein said controller applies dynamic braking to said motor when said wiper is returned to said parked state from said use state in response to said OFF signal.

9. The wiper system of claim 1, wherein said controller applies dynamic braking to said motor to prevent movement of said wiper from said parked state to said use state when said wiper is returned to said parked state from said use state.

10. The vehicle of claim 1, wherein said controller applies dynamic braking to said motor to prevent movement of said wiper from said parked state to said use state when said wiper is returned to said parked state from said use state.

11. A vehicle comprising:
a wiper associated with a surface of the vehicle;
a motor operable to selectively move said wiper between a parked state and a use state relative to said surface;
a switch operable to generate a signal that identifies whether said wiper is in said parked state or said use state; and
a controller in communication with said switch and including a second-order filter and a comparator, said controller passing said signal through said second-order filter and said comparator to differentiate between said parked state and said use state.

12. The vehicle of claim 11, wherein said switch includes a first plate, a second plate, and a conductive grease disposed between said first plate and said second plate.

13. The vehicle of claim 11, wherein said controller passes said signal through said second-order filter and subsequently passes an output of said second-order filter through said comparator.

14. The vehicle of claim 11, wherein said controller is a body controller of the vehicle.

15. The vehicle of claim 11, further comprising a user-input switch selectively supplying said controller with a control signal to direct said wiper between said parked state and said use state.

16. The vehicle of claim 15, wherein said controller identifies a state of said wiper based on an output of said comparator and controls said wiper based on said control signal.

17. The vehicle of claim 15, wherein said control signal is one of an ON signal requesting movement of said wiper between said parked state and said use state and an OFF signal requesting said wiper to remain in said parked state.

18. The vehicle of claim 17, wherein said controller applies dynamic braking to said motor when said wiper is returned to said parked state from said use state in response to said OFF signal.

* * * * *